United States Patent
Wang et al.

(10) Patent No.: US 9,053,715 B1
(45) Date of Patent: Jun. 9, 2015

(54) SYSTEM FOR PROVIDING A TRANSDUCER HAVING A SPLIT MAIN POLE

(75) Inventors: Lisha Wang, Fremont, CA (US); Tao Pan, San Jose, CA (US); Sining Mao, Fremont, CA (US); Zhigang Bai, Milpitas, CA (US); Feng Liu, San Ramon, CA (US); Zhanjie Li, Pleasanton, CA (US)

(73) Assignee: Western Digital (Fremont), LLC., Fremont, CA (US)

( * ) Notice: Subject to any disclaimer, the term of this patent is extended or adjusted under 35 U.S.C. 154(b) by 265 days.

(21) Appl. No.: 13/075,070

(22) Filed: Mar. 29, 2011

(51) Int. Cl.
*G11B 5/147* (2006.01)
*G11B 5/31* (2006.01)

(52) U.S. Cl.
CPC .......... G11B 5/3116 (2013.01); *Y10T 29/49044* (2015.01)

(58) Field of Classification Search
CPC ................... Y10T 29/49044; Y10T 29/49043
USPC ............. 360/125.06, 125.04, 125.07, 125.03, 360/125.02, 125.01
See application file for complete search history.

(56) References Cited

U.S. PATENT DOCUMENTS

| | | | |
|---|---|---|---|
| 5,668,689 A * | 9/1997 | Schultz et al. | 360/317 |
| 5,691,867 A * | 11/1997 | Onuma et al. | 360/125.41 |
| 5,710,683 A * | 1/1998 | Sundaram | 360/125.41 |
| 6,553,649 B1 * | 4/2003 | Santini | 29/603.14 |
| 6,671,135 B2 * | 12/2003 | Sasaki et al. | 360/317 |
| 6,694,604 B2 | 2/2004 | Santini | |
| 6,724,572 B1 | 4/2004 | Stoev et al. | |
| 6,791,793 B1 | 9/2004 | Chen et al. | |
| 6,906,894 B2 | 6/2005 | Chen et al. | |
| 6,965,494 B2 | 11/2005 | Campbell et al. | |
| 7,199,973 B2 | 4/2007 | Lille | |
| 7,271,982 B2 | 9/2007 | MacDonald et al. | |
| 7,646,564 B2 * | 1/2010 | Maruyama et al. | 360/125.07 |
| 7,656,611 B2 | 2/2010 | Liu et al. | |
| 7,777,989 B2 | 8/2010 | Sun et al. | |
| 8,077,434 B1 * | 12/2011 | Shen et al. | 360/125.12 |
| 8,259,410 B1 * | 9/2012 | Bai et al. | 360/125.02 |
| 2005/0180048 A1 * | 8/2005 | MacDonald et al. | 360/125 |
| 2009/0059427 A1 * | 3/2009 | Kudo et al. | 360/125.3 |
| 2009/0147410 A1 | 6/2009 | Jiang et al. | |

* cited by examiner

*Primary Examiner* — Julie Anne Watko

(57) ABSTRACT

A method and system for providing a magnetic recording head is described. The magnetic recording head has an air-bearing surface (ABS) configured to reside in proximity to a media during use. The magnetic recording head includes a main pole, at least one auxiliary pole, a nonmagnetic spacer, and at least one coil. The main pole includes a first main pole piece and a second main pole piece. The first main pole piece includes a pole tip occupying a portion of the ABS and a back edge distal from the ABS. The second main pole piece has a front surface. The auxiliary pole(s) have a front recessed from the ABS and are magnetically coupled with the main pole. The nonmagnetic spacer is between the back edge of the first main pole piece and the front surface of the second main pole piece. The coil(s) are for energizing the main pole.

18 Claims, 4 Drawing Sheets

SYSTEM FOR PROVIDING A TRANSDUCER HAVING A SPLIT MAIN POLE

BACKGROUND

FIG. 1 depicts a portion of a magnetic recording transducer 10, such as a perpendicular magnetic recording (PMR) transducer. For clarity, FIG. 1 is not to scale. The conventional PMR transducer 10 includes a shield 12, main pole 14, auxiliary pole 16, coils 18 and return pole/back gap 20. Although depicted as above the main pole 14 (with respect to the substrate that is not shown), the auxiliary pole 16 might be below the main pole 14. In operation, a current is driven through the coil(s) 18 to energize the main pole 14. As a result, the mail pole 14 writes to the media (not shown).

Although the conventional PMR transducer 10 may function, it may be inefficient. The trend in magnetic recording is to higher areal densities and higher data rates. For example, areal densities exceeding 550 Gb/in$^2$ and data rates of over 2 Gb/s are desired. Such high data rates require the conventional PMR transducer 10 to have a reduced rise time for the field at high frequencies. However, the performance of the conventional PMR transducer 10 rolls off significantly at higher data rates.

Accordingly, what is needed is a system and method for improving efficiency and performance of the PMR transducer.

BRIEF SUMMARY OF THE INVENTION

A method and system for providing a magnetic recording head is described. The magnetic recording head has an air-bearing surface (ABS) configured to reside in proximity to a media during use. The magnetic recording head includes a main pole, at least one auxiliary pole, a nonmagnetic spacer, and at least one coil. The main pole includes a first main pole piece and a second main pole piece. The first main pole piece includes a pole tip occupying a portion of the ABS and a back edge distal from the ABS. The second main pole piece has a front surface. The nonmagnetic spacer is between the back edge of the first main pole piece and the front surface of the second main pole piece. The auxiliary pole(s) have a front recessed from the ABS and are magnetically coupled with the main pole. The coil(s) are for energizing the main pole.

DETAILED DESCRIPTION OF THE EMBODIMENTS OF THE INVENTION

Figure 1:
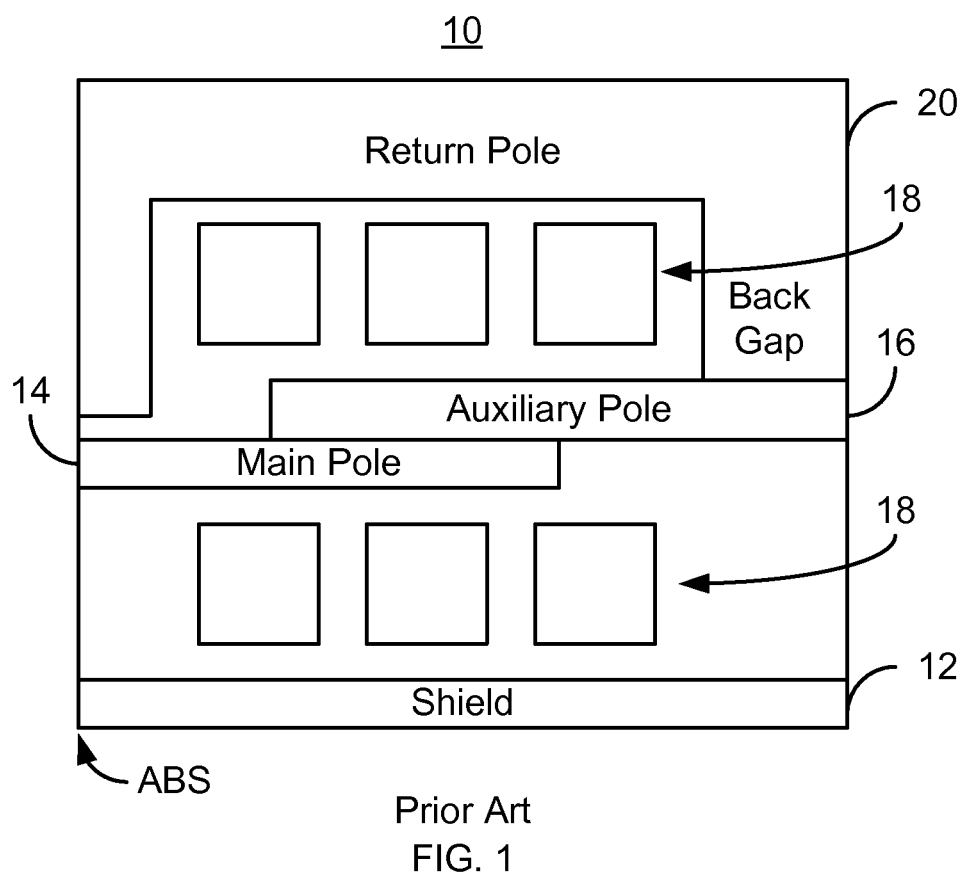
FIG. 1 is a diagram depicting a conventional PMR transducer.
Figure 2A:
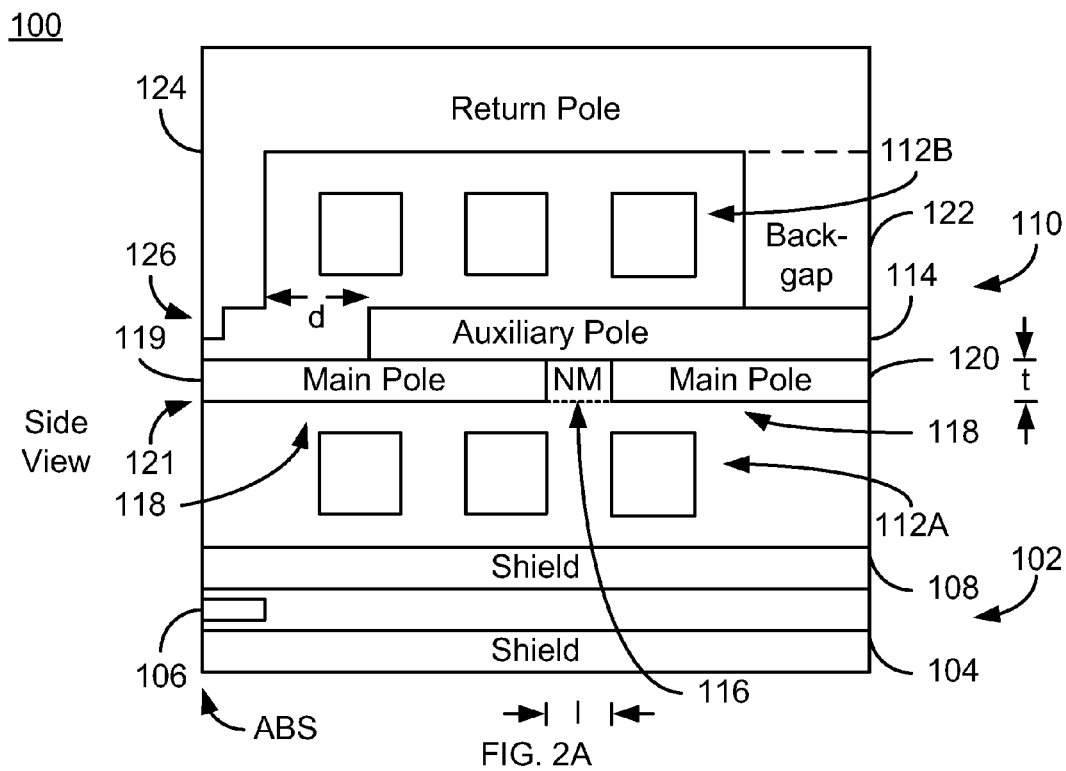
FIGS. 2A and 2B are diagrams depicting side and plan views of an exemplary embodiment of a PMR head.
Figure 2B:
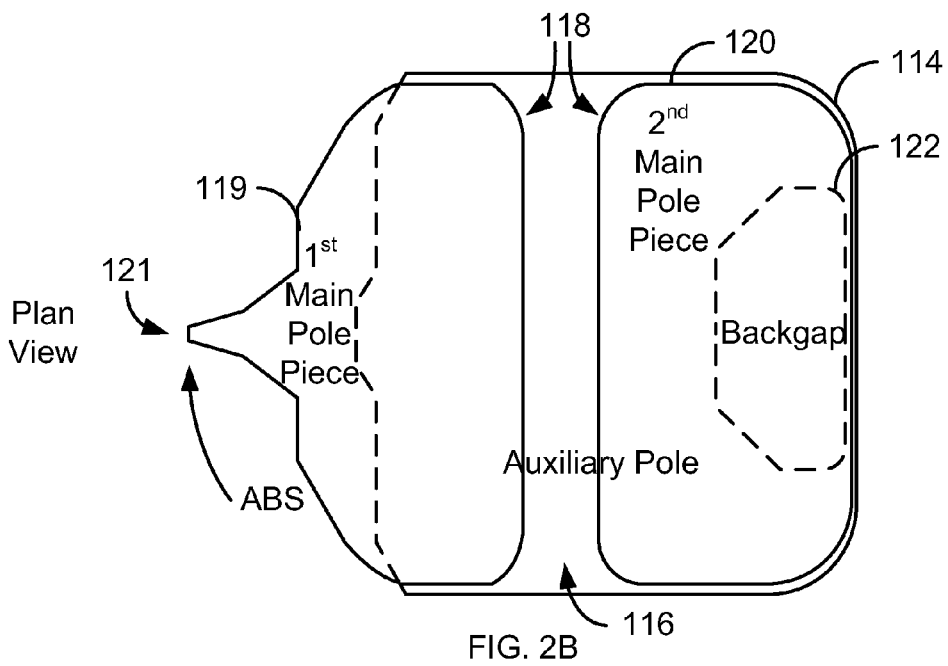

FIGS. 2A and 2B are diagrams depicting side and plan views, respectively, of a portion of a magnetic recording head 100 that may reside on a slider (not shown) in a disk drive that also include media (not shown). For clarity, FIGS. 2A and 2B are not to scale. Further, only some of the components depicted in the side view are also shown in the plan view. In some embodiments, the magnetic recording head 100 is a PMR head. Consequently, FIGS. 2A and 2B are described in the context of a PMR head. For simplicity not all portions of the PMR head 100 are shown. In addition, although the PMR head 100 is depicted in the context of particular components other and/or different components may be used. Further, the arrangement of components may vary in different embodiments. The PMR head 100 has an ABS configured to reside close to a media (not shown) during operation. The PMR head 100 is a merged head including a read transducer 102 and a write transducer (PMR transducer) 110. The read transducer 102 includes shields 104 and 108 as well as read sensor 106. In other embodiments, the PMR head 100 may include only the PMR transducer 110.

The PMR transducer 110 may be considered to include the shield 108. In addition, the PMR transducer 110 includes coil including portions 112A and 112B, auxiliary pole(s) 114, nonmagnetic spacer 116, main pole 118, backgap 122 and return pole 124. In some embodiments, the PMR transducer 110 may have other magnetic components, such as a wrap-around shield or side shields that are not shown. For clarity, the outer edges of the main pole 118/main pole pieces 119 and 120, auxiliary pole 114, and backgap 122 are shown in the plan view as residing at different locations. However, in some embodiments, the edges may overlap.

The main pole 118 has two main pole pieces 119 and 120. The first main pole piece 119 has a pole tip 121 that occupies a portion of the ABS. The pole tip 121 region of the first main pole piece 119 may have an ABS-facing surface that has a top wider than the bottom. Thus, the first main pole piece 119 may have a reverse angle. Further, although not shown, the pole tip 121 of the first main pole piece 119 may have top and/or bottom bevels such that the first main pole piece 119 is taller distal from the ABS. However, in other embodiments, the first main pole piece 119 may have other shapes. The first main pole piece 119 extends from the ABS to overlap the auxiliary pole 114. Thus, portions of the auxiliary pole 114 are shown by dashed lines in the plan view. The first main pole piece 119 terminates between the backgap 122 and the ABS. Further, the first main pole piece 119 terminates between the second main pole piece 120 and the ABS. The nonmagnetic spacer 116 is, therefore, between the back of the first main pole piece 119 and the front of the second main pole piece 118. Thus, in some embodiments, the back edge of the first main pole piece 119 may adjoin the nonmagnetic spacer 118.

The second main pole piece 120 has a front recessed from the ABS. The second main pole piece 120 overlaps both the auxiliary pole 114 and the back gap 122. Thus, portions of the backgap 122 are shown by dashed lines in the plan view. The front of the second main pole piece 120 is between the backgap 122 and the ABS. In the embodiment shown, the main pole pieces 119 and 120 are shown as having the same thickness, t. In some embodiments, this thickness(es) of the main pole pieces 119 and 120 is at least one hundred fifty nanometers. However in other embodiments the thicknesses of the main pole pieces 119 and 120 may differ. The saturation magnetization of both main pole pieces 119 and 120 are at least 2.3T. Further, the main pole pieces 119 and 120 may be composed of the same material(s). However, in other embodiments, the saturation magnetizations of the main pole pieces 119 and 120 may differ. Different materials may also be used for the main pole pieces 119 and 120. In addition, the main pole pieces 119 and 120 as well as the auxiliary pole(s) 114 may have different shapes than are shown in FIGS. 2A and 2B.

The nonmagnetic spacer 116 separates the main pole pieces 119 and 120. Further, the nonmagnetic spacer ensures that the main pole pieces 119 and 120 are not directly magnetically coupled. The nonmagnetic spacer 116 has a length, l, that is greater than zero microns. The shape anisotropy of the pole pieces 119 and 120 may thus be preserved. However, the separation between the main pole pieces 119 and 120 may be desired to be not too large. Thus, in some embodiments, the nonmagnetic spacer 116 has a length of not more than three microns. In some such embodiments, the length of the nonmagnetic spacer 116 is not more than two microns. In some embodiments, the nonmagnetic spacer 116 has a length of not more than one micron.

The auxiliary pole 114 is magnetically coupled with both pieces 119 and 120 of the main pole 118 and with the back gap 122. The auxiliary pole 114 is recessed from the ABS and resides between the main pole 120 and the return pole 124. A single auxiliary pole 114 is shown in FIGS. 2A and 2B. However, in other embodiments, multiple auxiliary poles and/or auxiliary pole(s) having other locations or configurations might be used. For example, in another embodiment, the main pole 118 may be between the auxiliary pole 114 and the return pole 124. In some embodiments, the thickness of the auxiliary pole 114 is at least 0.6 and not more than 1.5 μm. Further, the saturation magnetization of the auxiliary pole 114 may also be in the range of 1.0-2.3T. However, other thicknesses and saturation magnetizations may be used. As can be seen in FIGS. 2A and 2B, the auxiliary pole 114 may be desired to have its front edge at least a distance, d, from the back side of the pedestal 126. This separation may be desired to ensure that the pole 114 and pedestal 126 are not magnetically connected near the ABS. In some embodiments, this distance is desired to be at least 0.2 micron. However, in other embodiments, the distance between the pedestal 126 back and the front of the auxiliary pole 114 is at least 0.5 micron.

The backgap 122 magnetically couples the back portions of the auxiliary pole(s) 114, the second portion 120 of the main pole 118, and the return pole 124. In some embodiments, the return pole 124 and back gap 122 may be considered to act as a single entity and thus are separated by a dashed line in FIGS. 2A and 2B. The return pole 124 also includes a pedestal 126. In the embodiment shown, the pedestal 126 is shown as having a notch near its back surface. However, in other embodiments, the pedestal 126 may have different shapes. For example, the pedestal 126 may be free of the notch or may be sloped instead of notched. The coil(s) 112A/112B shown are helical coils. However, in other embodiments, other coils including but not limited to pancake coils may be used.

Using the PMR transducer 110, performance of the PMR head 100 may be improved. To write to the media, a current is driven through the coil(s) 112A/112B. The main pole 118 is thus energized. Because of the configuration of the main pole pieces 119 and 120, a desired field may be provided in a shorter time. More specifically, a reduced field rise time may be achieved for the main pole 118. Thus, the configuration of the PMR transducer 110 allows for higher data rate recording at greater areal densities. Consequently, performance of the PMR head 100 may be improved.

Figure 3:
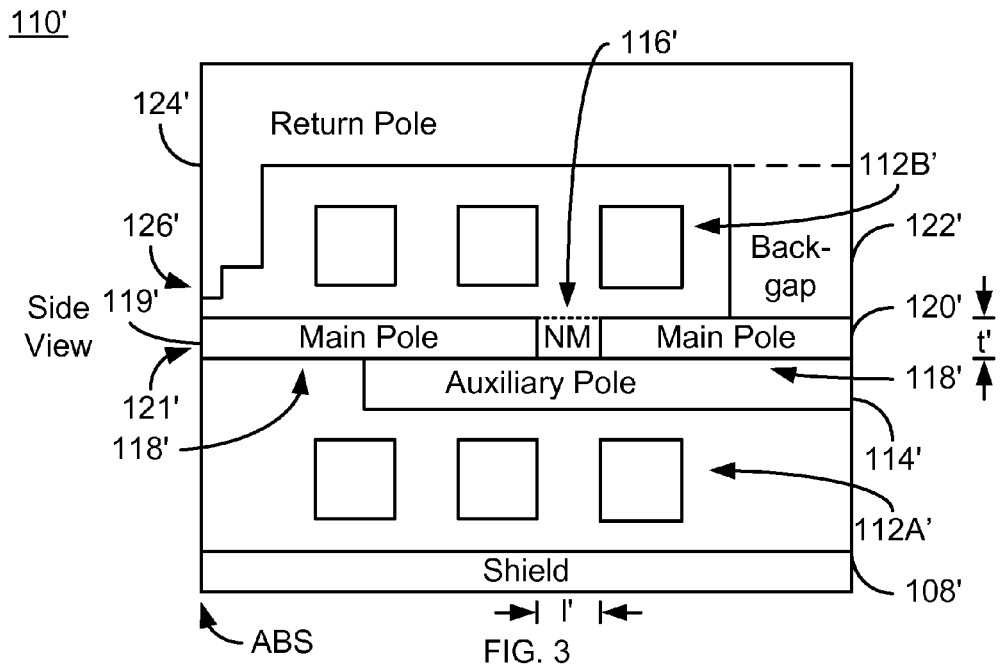
FIG. 3 is a diagram depicting a side view of another exemplary embodiment of a PMR transducer.

FIG. 3 depicts a side view of another exemplary embodiment of a PMR transducer 110'. For clarity, FIG. 3 is not to scale. Although FIG. 3 is described in the context of a PMR transducer, another type of transducer may be formed. For simplicity not all portions of the PMR transducer 110' are shown. In addition, although the PMR transducer 110' is depicted in the context of particular components other and/or different components may be used. Further, the arrangement of components may vary in different embodiments. The PMR transducer 110' has an ABS configured to reside close to a media (not shown) during operation. The PMR transducer 110' may be in a merged head including a read transducer and the PMR transducer 110' or may be in a separate write head. The PMR transducer 110' is analogous to the PMR transducer 110. Consequently, analogous portions have similar labels. The PMR transducer 110' thus includes the shield 108', coil(s) (including portions 112A' and 112B' shown), auxiliary pole 114', nonmagnetic spacer 116', main pole 118' including main pole pieces 119' and 120', backgap 122' and return pole 124' that are analogous to the shield 108, coil(s) (including portions 112A and 112B), auxiliary pole 114, nonmagnetic spacer 116, main pole 118 including main pole pieces 119 and 120, backgap 122 and return pole 124, respectively. In some embodiments, the PMR transducer 110' may have other magnetic components, such as a wraparound shield or side shields that are not shown.

The main pole 118' has two main pole pieces 119' and 120'. The first main pole piece 119' has a pole tip 121' that occupies a portion of the ABS. The pole tip 121' region of the first main pole piece 119' may have an ABS-facing surface that has a top wider than the bottom. Thus, the first main pole piece 119' may have a reverse angle. Further, although not shown, the pole tip 121' of the first main pole piece 119' may have top and/or bottom bevels. In other embodiments, the first main pole piece 119' may have other shapes. The first main pole piece 119' extends from the ABS to overlap the auxiliary pole 114' but terminates between the backgap 122' and the ABS. Further, the first main pole piece 119' terminates between the second main pole piece 120' and the ABS. The nonmagnetic spacer 116' is, therefore, between the back of the first main pole piece 119' and the front of the second main pole piece 118'. Thus, the back edge of the first main pole piece 119' may adjoin the nonmagnetic spacer 118'.

The second main pole piece 120' has a front recessed from the ABS. The second main pole piece 120' overlaps both the auxiliary pole 114' and the back gap 122'. The front of the second main pole piece 120' is between the backgap 122' and the ABS. In the embodiment shown, the main pole pieces 119' and 120' are shown as having the same thickness, t'. In some embodiments, this thickness(es) of the main pole pieces 119' and 120' is at least one hundred and fifty nanometers. However in other embodiments the thicknesses of the main pole pieces 119' and 120' may differ. In the embodiment shown, the main pole pieces 119' and 120' are composed of the same materials and have a saturation magnetization of at least 2.3T. However, in other embodiments, the saturation magnetizations of the main pole pieces 119' and 120' may differ. Different materials may also be used for the main pole pieces 119' and 120'. Further the shapes of the main pole pieces 119' and 120' as well as the auxiliary pole(s) 114' may be different than shown in FIG. 3.

The nonmagnetic spacer 116' separates the main pole pieces 119' and 120'. Further, the nonmagnetic spacer ensures that the main pole pieces 119' and 120' are not directly magnetically coupled. The nonmagnetic spacer 116' has a length, l', that is greater than zero microns to preserve the shape anisotropy of the pole pieces 119' and 120'. In some embodiments, the nonmagnetic spacer 116' has a length of not more than three microns. In some such embodiments, the length of the nonmagnetic spacer 116' is not more than two microns. In some embodiments, the nonmagnetic spacer 116' has a length of not more than one micron.

The auxiliary pole 114' is recessed from the ABS and magnetically coupled with both pieces 119' and 120' of the main pole 118' and with the back gap 122'. A single auxiliary pole 114' is shown. However, in other embodiments, multiple auxiliary poles and/or auxiliary pole(s) having other locations or configurations might be used. In the embodiment shown, the main pole 118' is between the auxiliary pole 114' and the return pole 124'. In some embodiments, the thickness of the auxiliary pole 114' is at least 0.6 and not more than 1.5 µm. Further, the saturation magnetization of the auxiliary pole 114' may be in the range of 1.0-2.3T. However, other thicknesses and saturation magnetizations may be used.

The backgap 122' magnetically couples the back portions of the auxiliary pole(s) 114', the second pole piece 120' of the main pole 118', and the return pole 124'. In some embodiments, the return pole 124' and back gap 122' may be considered to act as a single entity and thus are separated by a dashed line. The return pole 124' also includes a pedestal 126'. In the embodiment shown, the pedestal 126' is shown as having a notch near its back surface. However, in other embodiments, the pedestal 126' may have different shapes. The coil(s) 112A'/112B' shown are helical coils. However, in other embodiments, other coils including but not limited to pancake coils may be used.

Using the PMR transducer 110', performance of the PMR head 100 may be improved. Because of the configuration of the main pole pieces 119' and 120', a reduced field rise time may be achieved for the main pole 118'. Thus, the configuration of the PMR transducer 110' allows for higher data rate recording at greater areal densities. Consequently, performance of the PMR head 100' may be improved.

Figure 4:
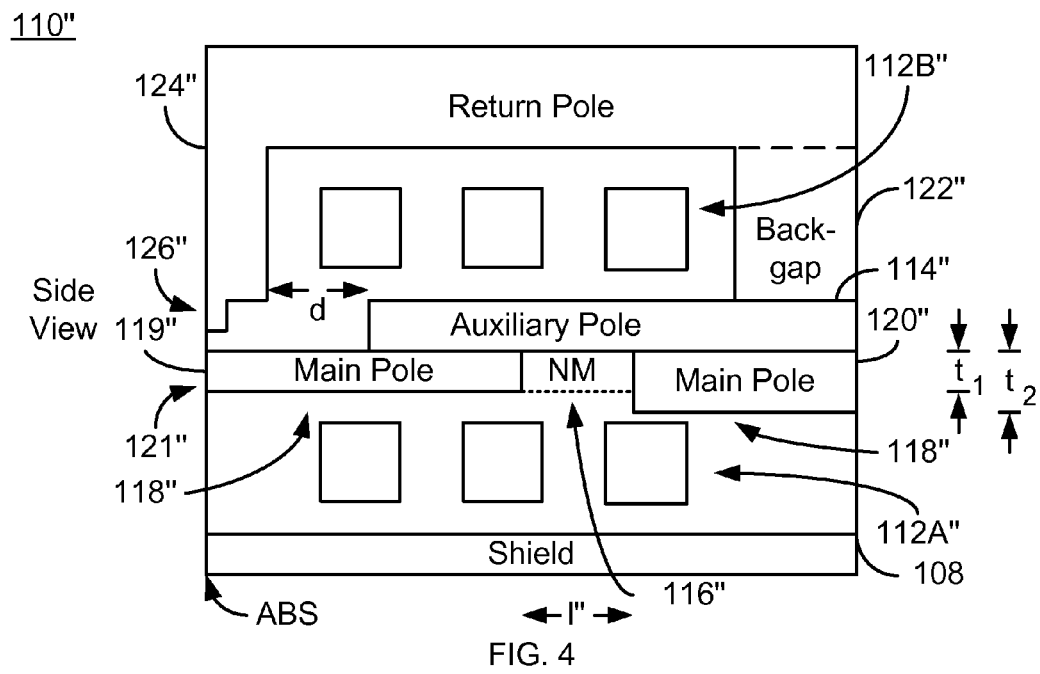
FIG. 4 is a diagram depicting a side view of another exemplary embodiment of a PMR transducer.

FIG. 4 depicts a side view of another exemplary embodiment of a PMR transducer 110". For clarity, FIG. 4 is not to scale. Although FIG. 4 is described in the context of a PMR transducer, another type of transducer may be formed. For simplicity not all portions of the PMR transducer 110" are shown. In addition, although the PMR transducer 110" is depicted in the context of particular components other and/or different components may be used. Further, the arrangement of components may vary in different embodiments. The PMR transducer 110" has an ABS configured to reside close to a media (not shown) during operation. The PMR transducer 110" may be in a merged head including a read transducer and the PMR transducer 110" or may be in a separate write head. The PMR transducer 110" is analogous to the PMR transducer 110. Consequently, analogous portions have similar labels. The PMR transducer 110' thus includes the shield 108", coil(s) (including portions 112A" and 112B" shown), auxiliary pole 114", nonmagnetic spacer 116", main pole 118" including main pole pieces 119" and 120", backgap 122" and return pole 124" that are analogous to the shield 108, coil(s) (including portions 112A and 112B), auxiliary pole 114, nonmagnetic spacer 116, main pole 118 including main pole pieces 119 and 120, backgap 122 and return pole 124, respectively. In some embodiments, the PMR transducer 110" may have other magnetic components, such as a wraparound shield or side shields that are not shown.

The structure and function of the components 108", 112A", 112B", 114", 116", 118", 119", 120", 122", and 124" that are analogous to the structure and function of the components 108, 112A, 112B, 114, 116, 118, 119, 120, 122, and 124, respectively. In addition, as can be seen in FIG. 4, the length, l", of the nonmagnetic spacer 116" differs from that shown in FIGS. 2 and 3. The nonmagnetic spacer 116" still ensures that the main pole pieces 119' and 120' are not directly magnetically coupled. The shape anisotropy of the pole pieces 119" and 120" is thus preserved. Further, the length l" of the nonmagnetic spacer 116" is still sufficiently small that the desired magnetic characteristics of the main pole 118" are preserved. Further, the second main pole piece 120" is shown has having a different thickness, $t_2$, than the thickness, $t_1$, of the first main pole piece 119". In other embodiments, the thicknesses $t_1$ and $t_2$ of the main pole pieces 119" and 120", respectively, may be the same.

Using the PMR transducer 110", performance of the PMR head 100 may be improved. Because of the configuration of the main pole pieces 119" and 120", a reduced field rise time may be achieved for the main pole 118". Thus, the configuration of the PMR transducer 110" allows for higher data rate recording at greater areal densities. Consequently, performance of the PMR head 100' may be improved.

Figure 5:
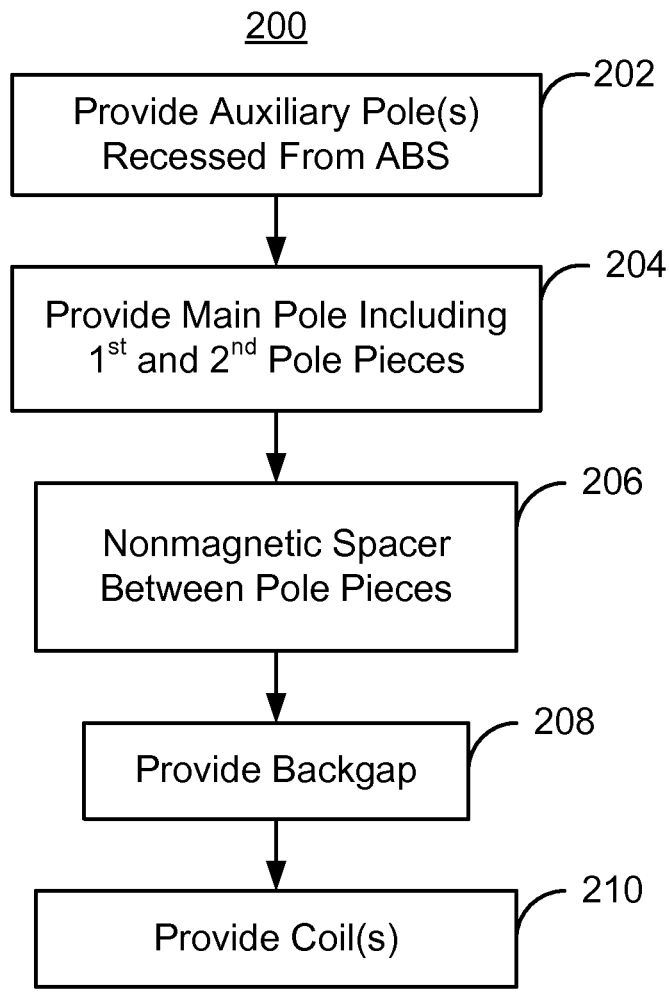
FIG. 5 is a flow chart depicting an exemplary embodiment of a method for fabricating a PMR transducer.

FIG. 5 depicts an exemplary embodiment of a method 200 of forming a portion of a PMR head. For simplicity, some steps may be omitted, combined, interleaved, and/or performed in another sequence. The method 200 is described in the context of the PMR head 100 and PMR transducer 110. However, the method 200 may be used to fabricate other PMR heads and other transducers such as the transducers 110' and/or 110". In addition, the method 200 is described in the context of fabricating a single disk drive 100. However, multiple transducers may be fabricated substantially in parallel. Further, although described as separate steps, portions of the method 200 may be interleaved. Finally, the steps of the method 200 typically include multiple substeps.

The auxiliary pole 114 is provided, via step 202. Step 202 may include depositing and patterning the auxiliary pole. The main pole 118 including pole pieces 119 and 120 is provided, via step 204. The pole tip 121 may also be fabricated, for example by patterning the ABS region of the PMR transducer 110. The nonmagnetic spacer 116 is also provided, via step 206. Step 206 may be part of patterning the layer(s) for the main pole 118 in step 204. The backgap 122 is provided, via step 208. Thus, the magnetic materials coupling the poles 114, 116, and 124 are provided. The coil(s) 112A and 112B are also provided, via step 210. Thus, a portion of step 210 may be performed before the remaining steps of the method 100. Fabrication of the transducer 100 may then be completed.

Using the method 200, the PMR transducers 110, 110', and/or 110" may be obtained. Consequently, the benefits of such devices may be achieved.

We claim:

1. A magnetic recording head having an air-bearing surface (ABS) configured to reside in proximity to a media during use, the magnetic recording head comprising:

a main pole including a first main pole piece and a second main pole piece, the first main pole piece including pole tip occupying a portion of the ABS and a back edge distal from the ABS, the second main pole piece having a front surface, each of the first main pole piece and the second main pole piece being flat;

at least one auxiliary pole having a front recessed from the ABS, the at least one auxiliary pole being magnetically coupled with the main pole;

a nonmagnetic spacer between the back edge of the first main pole piece and the front surface of the second main pole piece; and at least one coil for energizing the main pole.

2. The magnetic recording head of claim 1 wherein the main pole is a perpendicular magnetic recording pole.

3. The magnetic recording head of claim 1 wherein the at least one auxiliary pole is between the second main pole piece and the return pole.

4. The magnetic recording head of claim 1 wherein the second main pole piece is between the at least one auxiliary pole and the return pole.

5. The magnetic recording head of claim 1 wherein the at least one auxiliary pole includes a first auxiliary pole and a second auxiliary pole, the first auxiliary pole residing between the second auxiliary pole and the return pole.

6. The magnetic recording head of claim 1 wherein the first main pole piece has a first thickness, wherein the second main pole piece has a second thickness, and wherein the first thickness is different from the second thickness.

7. The magnetic recording head of claim 1 wherein the first main pole piece includes at least a first magnetic material, wherein the second main pole piece includes at least a second magnetic material, and wherein the at least the first magnetic material is different from the at least the second magnetic material.

8. A magnetic recording head having an air-bearing surface (ABS) configured to reside in proximity to a media during use, the magnetic recording head comprising:
 a main pole including a first main pole piece and a second main pole piece, the first main pole piece including pole tip occupying a portion of the ABS and a back edge distal from the ABS, the second main pole piece having a front surface having a front edge, each of the first main pole piece and the second main pole piece being flat;
 at least one auxiliary pole having a front recessed from the ABS, the at least one auxiliary pole being magnetically coupled with the main pole and being flat;
 a nonmagnetic spacer between the back edge of the first main pole piece and the front surface of the second main pole piece;
 at least one coil for energizing the main pole;
 a backgap distal from the ABS; and
 a return pole magnetically coupled with the at least one auxiliary pole and the main pole through the backgap;
 the first main pole piece includes at least a first magnetic material, wherein the second main pole piece includes at least a second magnetic material, and wherein the at least the first magnetic material is different from the at least the second magnetic material, wherein the at least the first magnetic material has a first saturation magnetization, wherein the at least the second magnetic material has a second saturation magnetization, and wherein the first saturation magnetization is different from the second saturation magnetization.

9. The magnetic recording head of claim 1 wherein the at least one coil includes a helical coil.

10. A perpendicular magnetic recording (PMR) head having an air-bearing surface (ABS) configured to reside in proximity to a media during use, the magnetic recording head comprising:
 a main pole including a first main pole piece and a second main pole piece, the first main pole piece including pole tip occupying a portion of the ABS, a back edge distal from the ABS, and a first thickness, the second main pole piece having a front surface and a front edge and a second thickness, the first thickness being substantially the same as the second thickness, each of the first main pole piece and the second main pole piece being flat;
 at least one auxiliary pole having a front recessed from the ABS and a back portion, the at least one auxiliary pole being magnetically coupled with the main pole and being flat, the at least one auxiliary pole physically contacting the back edge of the first main pole piece and the front edge of the second main pole piece;
 a nonmagnetic spacer adjoining the back edge of the first main pole piece and the front surface of the second main pole piece;
 a backgap distal from the ABS and coupled with the back portion of the at least one auxiliary pole;
 a return pole magnetically coupled with the at least one auxiliary pole and the main pole through the backgap; and
 at least one helical coil for energizing the main pole.

11. A magnetic recording disk drive comprising:
 a slider;
 a magnetic recording head coupled with the slider and including a main pole, at least one auxiliary pole, a nonmagnetic spacer and at least one coil, the main pole including a first main pole piece and a second main pole piece, the first main pole piece including pole tip occupying a portion of an air-bearing surface (ABS) and a back edge distal from the ABS, each of the first main pole piece and the second main pole piece being flat, the second main pole piece having a front surface and a front edge, the at least one auxiliary pole having a front recessed from the ABS, the at least one auxiliary pole being magnetically coupled with the main pole and being flat, the at least one auxiliary pole physically contacting the back edge of the first main pole piece and the front edge of the second main pole piece, the nonmagnetic spacer being between the back edge of the first main pole piece and the front surface of the second main pole piece, and the at least one coil for energizing the main pole, the backgap being distal from the ABS, the return pole being magnetically coupled with the at least one auxiliary pole and the main pole through the backgap.

12. A method for providing a magnetic recording head having an air-bearing surface (ABS) configured to reside in proximity to a media during use, the method comprising:
 providing a main pole including a first main pole piece and a second main pole piece, the first main pole piece including pole tip occupying a portion of the ABS and a back edge distal from the ABS, the second main pole piece having a front surface and a front edge, each of the first main pole piece and the second main pole piece being flat;
 providing at least one auxiliary pole having a front recessed from the ABS and a back portion, the at least one auxiliary pole being magnetically coupled with the main pole and being flat;
 providing a nonmagnetic spacer adjoining the back edge of the first main pole piece and the front surface of the second main pole piece; and
 providing at least one coil for energizing the main pole;
 providing a backgap distal from the ABS; and
 providing a return pole magnetically coupled with the at least one auxiliary pole and the main pole through the backgap;
 wherein the at least one auxiliary pole physically contacts the back edge of the first main pole piece and the front edge of the second main pole piece.

13. The magnetic recording head of claim 1 wherein the nonmagnetic spacer separates the back edge of the first main pole piece and the front surface of the second main pole piece by a distance, the distance being not more than one micron.

14. The perpendicular magnetic recording head of claim 10 wherein the nonmagnetic spacer separates the back edge of the first main pole piece and the front surface of the second main pole piece by a distance, the distance being not more than one micron.

15. The magnetic recording disk drive of claim 11 wherein the nonmagnetic spacer separates the back edge of the first main pole piece and the front surface of the second main pole piece by a distance, the distance being not more than one micron.

16. The magnetic recording head of claim 1 wherein the second main pole piece has a second back edge, the auxiliary pole contacting at least a portion of the back edge of the first main pole piece and a portion of the second back edge of the second main pole piece.

17. The PMR head of claim 10 wherein the second main pole piece has a second back edge, the auxiliary pole contacting at least a portion of the back edge of the first main pole piece and a portion of the second back edge of the second main pole piece.

18. The magnetic recording disk drive of claim 11 wherein the second main pole piece has a second back edge, the auxiliary pole contacting at least a portion of the back edge of the first main pole piece and a portion of the second back edge of the second main pole piece.

\* \* \* \* \*